(12) United States Patent
Estrada et al.

(10) Patent No.: US 9,601,159 B2
(45) Date of Patent: Mar. 21, 2017

(54) REMOTELY CONTROLLED AUDIO AND VIDEO RECORDING SYSTEM

(71) Applicants: Jorge L. Estrada, Glendale, CA (US); Henry Chen, Los Angeles, CA (US); Zachariah Purnajo, Temple City, CA (US)

(72) Inventors: Jorge L. Estrada, Glendale, CA (US); Henry Chen, Los Angeles, CA (US); Zachariah Purnajo, Temple City, CA (US)

(*) Notice: Subject to any disclaimer, the term of this patent is extended or adjusted under 35 U.S.C. 154(b) by 0 days.

(21) Appl. No.: 14/619,814

(22) Filed: Feb. 11, 2015

(65) Prior Publication Data

US 2016/0232944 A1 Aug. 11, 2016

(51) Int. Cl.
| H04N 5/765 | (2006.01) |
| H04N 9/80 | (2006.01) |
| G11B 27/34 | (2006.01) |
| G11B 20/10 | (2006.01) |

(52) U.S. Cl.
CPC ........ *G11B 27/34* (2013.01); *G11B 20/10527* (2013.01); *G11B 2020/10546* (2013.01)

(58) Field of Classification Search
None
See application file for complete search history.

(56) References Cited

U.S. PATENT DOCUMENTS

| 4,539,711 A * | 9/1985 | Harger ............... G11B 19/02 348/731 |
| 5,903,868 A | 5/1999 | Yuen |
| 6,292,543 B1 | 9/2001 | Cannon |
| 2002/0190956 A1 * | 12/2002 | Klein ............... G06F 1/1626 345/169 |

* cited by examiner

*Primary Examiner* — Hung Dang
(74) *Attorney, Agent, or Firm* — Albert O. Cota

(57) ABSTRACT

A remotely controlled audio and video recording system (RAVRS) that includes a remote control unit (RCU) and an audio and video recorder (AVR). The AVR, which is located near a speaker's podium, is remotely controlled by an individual operating the RCU. The RAVRS allows the individual to selectively select and "mark" certain passages of a specific lecture for later retrieval.

12 Claims, 3 Drawing Sheets

_(1)_

REMOTELY CONTROLLED AUDIO AND VIDEO RECORDING SYSTEM

TECHNICAL FIELD

The invention generally pertains to audio and video recorders, and more particularly to remotely controlled audio and video recording system that allows selected passages of an on-going lecture to be stopped and/or "marked" for later retrieval.

BACKGROUND ART

As time has progressed, technology has provided the ability to record and playback audio and video. At the beginning of each of their respective developments, both audio and video recorders were high-end, expensive items that only a select few could acquire. As designs and manufacturing processers improved and were less costly, it became possible for average consumers to purchase audio and video recorders for personal use.

Today audio and video recorders are responsible for many of the necessitates and conveniences of modern life. Music, television, films and compute programs all relay on audio and/or video recorders to function. In addition to those common uses and applications, audio and video recorders have also improved an individual's ability to perform contain requirements. For example, audio and video recorders have improved the lives of people with physical or mental disabilities.

Another use of audio and video recording is to assist students, employees and others who are being taught various subjects. Instead of relying on memory or note-taking, a person at a lecture can record what is said by the teacher. By adding video recording, a person can also view what a teacher is writing on a board or showing. Unfortunately, in order to facilitate recording audio or video of a lecture, for example, a person will typically use a standard general use audio or video recorder, or another device that happens to have audio and/or video recording capability.

None of these devices are optimally designed to record audio or video in an educational setting, which often places the student a distance from the teacher and contends with other difficult recording conditions.

What is needed is a purpose designed and built audio and/or video recorder for use in an educational setting, to record lectures or other information. The lecture recorder would be capable of recording from a distance and would provide functionally such as marker setting to quickly and easily allow a person to access a particular part on section of an extended lecture.

A search of the prior art did not disclose any literature or patents that read directly on the claims of the instant invention. However, the following U.S. patents are considered related:

| PAT. NO. | INVENTOR | ISSUED |
| --- | --- | --- |
| 5,965,821 | Bouchard | 21 Jun. 2011 |
| 6,292,543 | Cannon | 18 Sep. 2001 |
| 5,903,868 | Yuen | 11 May 1999 |

The U.S. Pat. No. 5,965,821 patent discloses a method for controlling a voice recorder that is used to record a voice session between an origination device and a destination device. The method can be executed at a computing apparatus coupled to the origination device and to the voice recorder.

The U.S. Pat. No. 6,292,543 patent discloses a voice messaging system for receiving information relating to an incoming telephone call and includes a memory to store the information relating to the incoming call. A processor initiates an outgoing announcing message in response to the incoming call. A voice recorder records in the memory a voice message corresponding to the incoming call.

The U.S. Pat. No. 5,903,868 patent discloses an audio recorder having a retroactive storage capability that operates under control of a sound responsive switch. The switch enters signals representative of the instantaneous sound signals received by a microphone into a first-in first-out memory. When the memory is filled, digital signals representative of newly recorded sound supplant the oldest signals in the memory. An operator listening to the sound may retroactively capture signals representative of the most recently occurring sounds.

DISCLOSURE OF THE INVENTION

The remotely controlled audio and video recording system (RAVRS) is comprised of an audio and video recorder (AVR) that is controlled by an individual who is operating remote control unit (RCU). The RAVRS includes a circuit that allows an on-going lecture to be stopped and "marked" for later retrieval.

The RCU, which is preferably housed in an ergonomically shaped, enclosure that resembles a writing pen, includes a set of switches (S2-S6) that enable the following commands: START/RECORD, STOP, PAUSE, MARK and PLAYBACK.

The RCU includes an RF integrated CPU (RIC) that is a powered by a power input circuit (PIC) and that is designed to process the commands applied from the FSC switches (S2-S6). The RCU also includes a function indicating circuit (FIC) that has a set of LEDs (D1-D5) which illuminate in synchrony with the corresponding switch. The RCU applies via an RF transmitting antenna the signal processed by the RIC to the AVR where the selected command signal is further processed.

The audio data is stored on a USB memory stick that is inserted into a USB jack via a USB controller circuit or is stored in EEPROM. In either case the audio passes through the PRC which processes the audio data and sends the data to the storage device.

The video data is also stored on a USB memory stick that is plugged into a USB jack via the USB controller or stored in EEPROM. The USB memory stick allows a convenient storage of data since a separate USB memory stick can be used for each class or lecture. Using the internal memory places all classes or lectures recorded in the same memory which makes it difficult to locate when a person wants to playback a specific lecture from a specific class.

Connected to the PRC is a microphone that is used to record the audio. The microphone preferably functions with an audio amplifier having automatic volume control (AVC). This will be needed if the person speaking turns back towards a blackboard or the like and away from the audience while giving a lecture. By using an automatic volume control the recorded audio is maintained at a constant volume level. Preferably a unidirectional microphone is also utilized to prevent ambient noise from interfering with the audio being recorded. The audio being recorded is preferably compressed into a way or other file and is stored either in the memory of the PRC or on the removable USB memory stick.

The MARK switch can be activated at any time during a recording so that during playback the recording jumps forward to the marked point(s) in the recording. An acknowledgment sent back to the RCU causes the MARK in the RCU to blink as a recognition that a marker was set at that point in the recording.

When playing back the recording, pressing the MARK switch will cause the recording to jump ahead to the start of the next recording or to the next marked set point that was added during or after a recording. This enables a person to skip to the start of the next recording or jump to a selected passage(s) in the recording. When the START switch on the RCU is activated, the PRC receives the command and begins recording. Before the recording commences the AVR sends back to the RCE an acknowledgment command. This is read by the RCU which in turn activates the corresponding LED in the RCU. This lets the person utilizing the RAVRS to know that the function command was received by the AVR and what command is presently being processed.

The PAUSE command from the RCU can also be activated at any time to pause the current recording. This would be used, for example, if the speaker decides to take a break during a lecture. Activating the START/RECORD switch resumes the current recording. Since the PRC knows that the RAVRS is in the PAUSE mode, a marker is not placed when the START/RECORD switch is activated to resume the recording.

The video can be taken with a digital camera or a cell phone. For example, the video can consist of an image of a blackboard with notes from the speaker. The pictures are processed through a wireless protocol such as BLUETOOTH and stored in either the main memory or on a USB memory stick. However, the PRE will have to set up a folder in memory and store the pictures in that folder to keep it separate from the audio recordings. Note that pictures from a cell phone cannot be processed during a recording as it would interrupt the recording and lose part of the audio. When pressing the PLAYBACK switch is activated the audio is stored.

In view of the above disclosure, the primary object of the invention is to produce a remotely controlled audio and video recording system that allows selected passages of a particular lecture to be marked for later retrieval.

In addition to the primary object of the invention it is also an object of the invention to provide an invention that:
is easy to use,
can be utilized by both students and professional persons,
is dimensioned to be easily carried and stored when not in use,
provides high quality audio or video recording,
can significantly increase a student's ability to learn/acquire the information given in a lecture,
can be configured to be used as an audio and/or a video recorder, and
is cost effective from both a manufacturer's and consumer's point of view.

These and other objects and advantages of the present invention will become apparent from the sub sequent detailed description of the preferred embodiment and the appended claims taken in conjunction with the accompanying drawings.

BEST MODE FOR CARRYING OUT THE INVENTION

Figure 1:
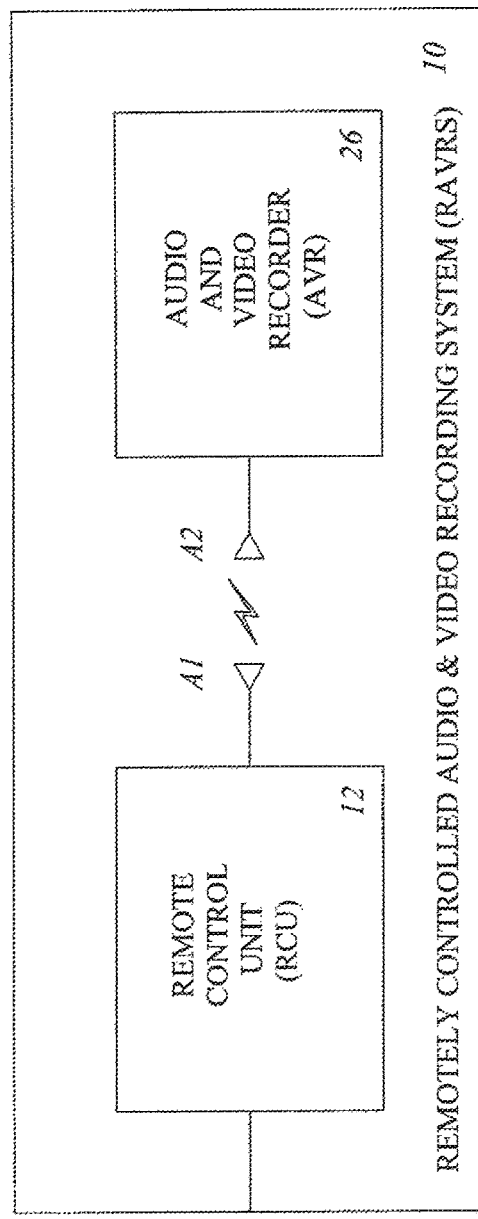
FIG. 1 is a block diagram of the remotely controlled audio and video recording system (RAVRS).
Figure 2:
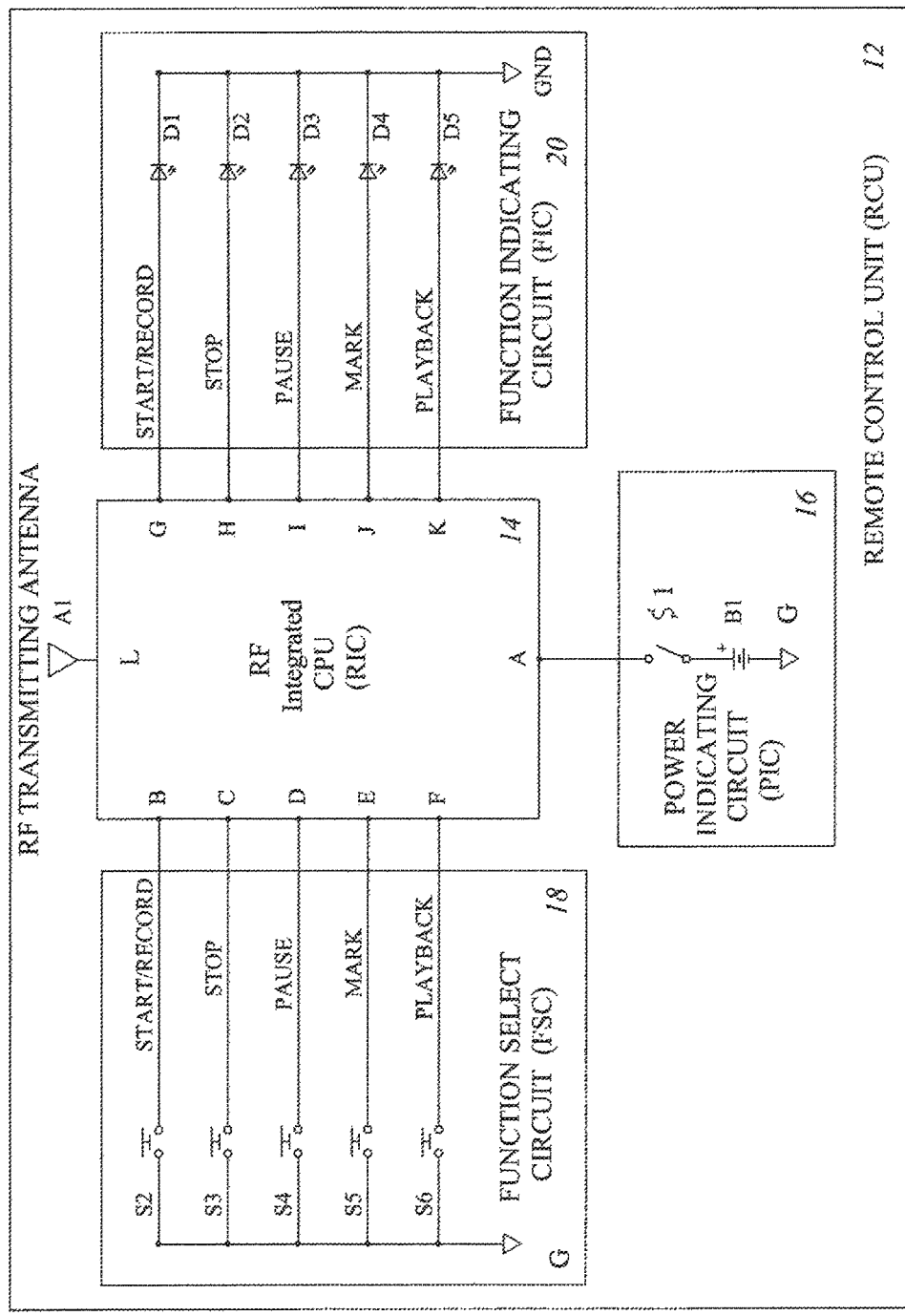
FIG. 2 is a block diagram of the remote control unit (RCU).
Figure 3:
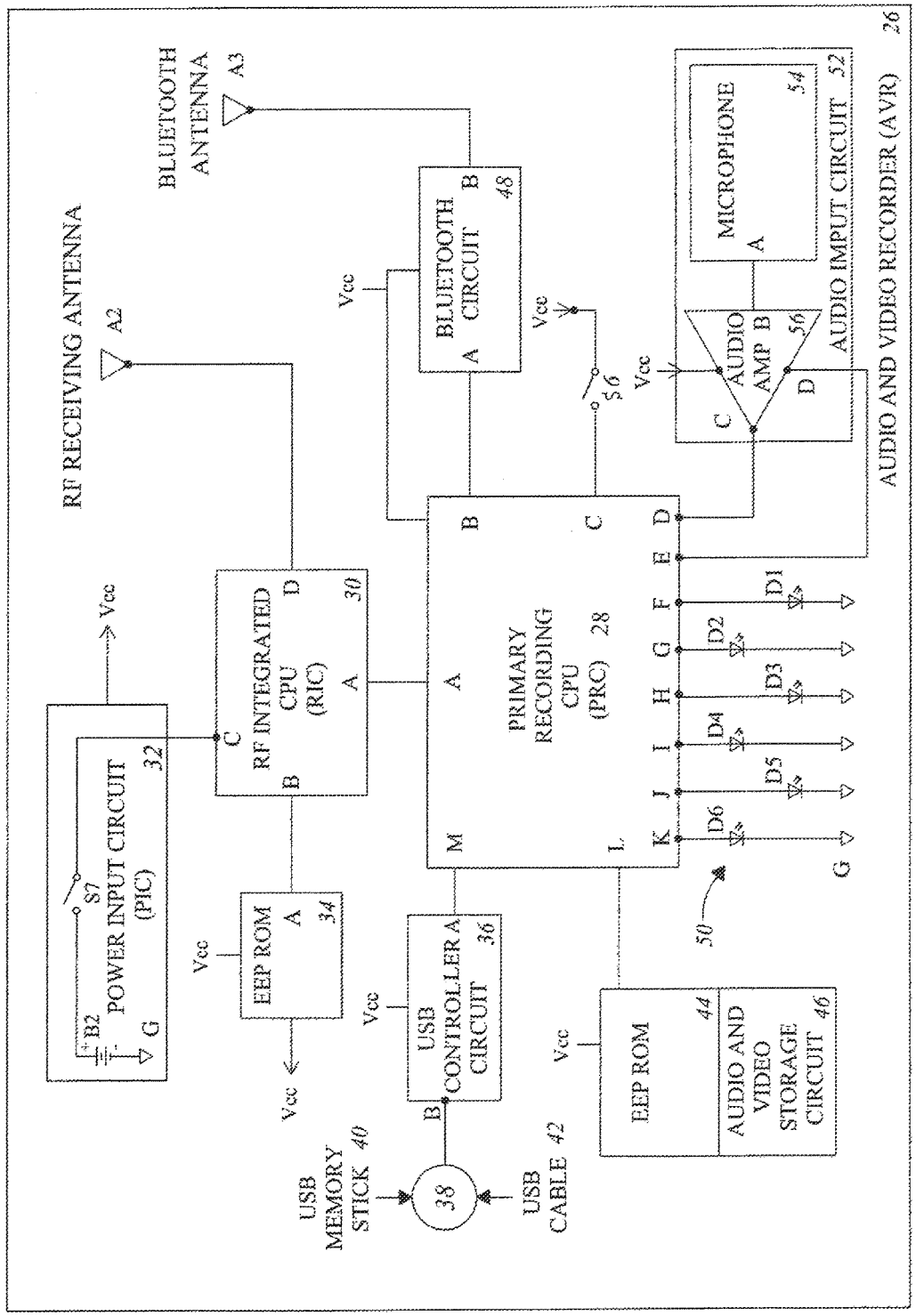
FIG. 3 is a block diagram of the audio and video recorder (AVR).

The best mode for carrying out the invention is presented in terms that disclose a preferred embodiment of a remotely controlled audio and video recording system (RAVRS 10), which is comprised, as shown in FIGS. 1-3, of a remote control unit (RCU) 12 and an audio and video recorder (AVR) 26. The AVR 26 is located in the vicinity of a speaker and is remotely controlled by the RCU 12 which is operated by an individual such as a student in a classroom. The RCU 12, as shown in FIGS. 1 and 2, is enclosed in an ergonomically designed enclosure (not shown) which resembles a writing pen and that includes all the necessary controls to allow an individual to remotely operate the AVR 26.

The RCU 12 which is the first major element of the RAVRS 10 is shown in FIG. 2, and is comprised of an RF integrated CPU (RIC 14) that includes pins A-L, a power input circuit (PIC) 16, a function select circuit (FSC 18), a function indicating circuit (FIC 20) and an RF transmitting antenna (AL) connected to pin L on the RIC 14.

The PIC 16 is comprised of a power switch (S1) having a first side connected to pin A on the RIC 14 and a second side connected in series with the + terminal of a battery (B1) also having a − terminal connected to ground (G). The FSC 18 is comprised of a START/RECORD switch (S2) having a first side connected to pin B on the RIC 14 and a second side connected to ground (G), a STOP switch (S3) having a first side connected to pin C on the RIC 14 and a second side connected to ground (G), a PAUSE switch (S4) having a first side connected to pin D on the RIC 14 and a second side connected to ground (G), a MARK switch (S5) having a first side connected to pin E on the RIC (14) and a second side connected to ground (G), and a PLAYBACK switch (S6) having a first side connected to pin F on the RIC (14) and a second side connected to ground (G).

The FIC 20 is comprised of a START/RECORD LED D1 having an anode connected to pin G on the RIC 14 and a cathode connected to ground G, a STOP LED D2 having an anode connected to pin H on the RIC 14 and a cathode connected to ground G, a PAUSE LED D3 having an anode connected to pin I on the RIC 14 and a cathode connected to ground G, a MARK LED D4 having an anode connected to pin J on the RIC 14 and a cathode connected to ground G, and a PLAYBACK LED D5 having an anode connected to pin K on the RIC 14 and a cathode connected to ground G.

The audio and video recorder (AVR) 26, which is the second major element of the RAVR 10, is shown in FIG. 3, and is comprised of a primary recording CPU (PRC) 28 having pins A-M, an RF integrated CPU (RIC) 30 having pins A-D, wherein pin A is connected to pin A on the PRC 28, a power input circuit (PIC) 32 comprising a power switch S7 having a first side connected to pin C on the RIC 30 and a second side connected in series with the + terminal of a battery B2 also having a − terminal connected to ground G, an EEPROM 34 having a pin A connected to pin B on the RIC 30, a RF receiving antenna A2 connected to pin D on the RIC 30, a USB controller circuit 36 having a pin A connected to pin M on the PRC 28 and a pin B connected to a USB jack 38 designed to receive a plug-in USB memory stick 40 or a USB cable 42 that is attached to a computer (not shown), an EEPROM 44 connected to pin L on the PRC 28, an audio and video storage circuit 46 that interfaces with the EEPROM 44, a playback switch S6 connected to pin C on the PRC 28, a Bluetooth circuit 48 having a pin A connected to pin B on the PRC 28 and a pin B connected to a BLUETOOTH receiving antenna A3, function indicating circuit 50 having a set of light emitting diodes (D1-D6), wherein LED D1 is a START/RECORD LED connected to pin F on the PRC 28, LED D2 is a STOP LED connected to pin G on the PRC 28, LED D3 is a PAUSE LED connected to pin H on the PRC 28, LED D4 is a MARK LED connected to pin I on the PRC 28, LED D5 is a PLAYBACK LED connected to pin J on the PRC 28 and LED D6 is a PAUSE LED connected to pin K on the PRC 28. The AVR 26 also utilizes an audio input circuit 52 comprising a microphone 54 having a pin A connected to pin B on an automatic volume control (AVC) audio amplifier 56 having an output pin C connected to pin D on the PRC 28 and an input pin D connected to pin E on the PRC 28.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A remotely controlled audio recording system (RARS 10) comprising:
   A) a remote control unit (RCU 12) comprising:
      a) an RF integrated CPU (RIC 14) having pins (A-F and L),
      b) a power input circuit (PIC 16) comprising a power switch (S1) having a first side connected to pin A on said RIC (14) and a second side connected in series with the positive (+) terminal of a battery (B1) also having a negative (−) terminal connected to ground (G),
      c) a function select circuit (FSC 18) comprising:
         (1) a START/RECORD switch (S2) having a first side connected to pin B on said RIC and a second side connected to ground (G),
         (2) a STOP switch (S3) having a first side connected to pin C on said RIC (14) and a second side connected to ground (G),
         (3) a PAUSE switch (S4) having a first side connected to pin D on said RIC (14) and a second side connected to ground (G),
         (4) a MARK switch (S5) having a first side connected to pin E on said RIC (14) and a second side connected to ground (G),
         (5) a PLAYBACK switch (S6) having a first side connected to pin F on said RIC (14) and a second side connected to ground (G), and
      d) an RF transmitting antenna (A1) connected to pin L on said RIC (14),
   B) an audio recorder (AR 26) comprising:
      a) a primary recording CPU (PRC 28) having pins (A, C-K and M),
      b) a RF integrated CPU (RIC 30) having pins A-D, wherein pin A is connected to pin A on said PRC (28),
      c) a power input circuit (PIC 32) comprising a power switch (S7) having a first side connected to pin C on said RIC (30) and a second side connected in series with the positive (+) terminal of a battery (B2) also having a negative (−) terminal connected to ground (G),
      d) an EEPROM having a pin A connected to pin B on said RIC (30),
      e) a RF receiving antenna (A2) connected to pin D on said RIC (30),
      f) an EEPROM program (44) connected to pin L on said PRC (28),
      g) a playback switch (S6) connected to pin C on said PRC (28), and
      h) an audio input circuit (52) comprising a microphone (54) having an output pin (A) connected to pin (D) on said PRC (28).

2. The system as specified in claim 1 further comprising a function indicating circuit (20) having:
   (1) a START/RECORD LED (D1) having an anode connected to pin G on said RIC (14) and a cathode connected to ground (G),
   (2) a STOP LED (D2) having an anode connected to pin H on said RIC (14) and a cathode connected to ground (G),
   (3) a PAUSE LED (D3) having an anode connected to pin I on said RIC (14) and a cathode connected to ground (G),
   (4) a MARK LED (D4) having an anode connected to pin J on said RIC (14) and a cathode connected to ground (G), and
   (5) a PLAYBACK LED (D5) having an anode connected to pin K on said RIC (14) and a cathode connected to ground (G).

3. The system as specified in claim 1 wherein said RCU (12) is housed in an enclosure that includes the controls to operate said AVR.

4. The system as specified in claim 3 further comprising a USB controller (36) having a pin A connected to pin M on said PRC (28), and a pin B connected to a USB jack (38) that receives a plug-in USB memory stick (40) or a USB cable connected to a computer (42).

5. The system as specified in claim 3 further comprised of a plurality of function indicating LEDs (50), wherein a LED (D1) is playback LED connected to pin H on said PRC 24, LED (D2) is a transmitting/recording LED connected to pin G on said PRC (28) and LED (D3) is a power LED connected to pin F on said PRC (28).

6. A remotely controlled audio and video recording system (RAVRS 10) comprising:
   A) a remote control unit (RCU 12) comprising:
      a) an RF integrated CPU (RIC 14) having pins (A-K)
      b) a power input circuit (PIC 16) comprising a power switch (S1) having a first side connected to pin A on said RIC (14) and a second side connected in series with the positive (+) terminal of a battery (B1) also having a negative (−) terminal connected to ground (G),
      c) a function select circuit (FSC 18) comprising:
         (1) a START/RECORD switch (S2) having a first side connected to pin B on said RIC and a second side connected to ground (G),
         (2) a STOP switch (S3) having a first side connected to pin C on said RIC (14) and a second side connected to ground (G),
         (3) a PAUSE switch (S4) having a first side connected to pin D on said RIC (14) and a second side connected to ground (G),
         (4) a MARK switch (S5) having a first side connected to pin E on said RIC (14) and a second side connected to ground (G), (5) a PLAYBACK switch (S6) having a first side connected to pin F on said RIC (14) and a second side connected to ground (G),
d) a function indicating circuit (FIC 20) comprising:
  (1) a START/RECORD LED (D1) having an anode connected to pin G on said RIC (14) and a cathode connected to ground (G),
  (2) a STOP LED (D2) having an anode connected to pin H on said RIC (14) and a cathode connected to ground (G),
  (3) a PAUSE LED (D3) having an anode connected to pin I on said RIC (14) and a cathode connected to ground (G),
  (4) a MARK LED (D4) having an anode connected to pin J on said RIC (14) and a cathode connected to ground (G),
  (5) a PLAYBACK LED (D5) having an anode connected to pin K on said RIC (14) and a cathode connected to ground (G), and
e) a RF transmitting antenna (A1) connected to pin L on said RIC (14),
B) an audio and video recorder (AVR 26) comprising:
a) a primary recording CPU (PRC 28) having pins A-M,
b) a RF integrated CPU (RIC 30) having pins A-D, wherein pin A is connected to pin A on said PRC (28),
c) a power input circuit (PIC 32) comprising a power switch (S7) having a first side connected to pin C on said RIC (30) and a second side connected in series with the positive (+) terminal of a battery (B2) also having a negative (−) terminal connected to ground (G),
d) an EEPROM (34) having a pin A connected to pin B on said RIC (30),
e) a RF receiving antenna (A2) connected to pin D on said RIC (30),
f) an EEPROM (44) connected to pin L on said PRC (28),
g) an audio and video storage circuit (46) that interfaces with said EEPROM (44),
h) a playback switch (S6) connected to pin C on said PRC (28),
i) a BLUETOOTH circuit (48) having a pin A connected to pin B on said PRC (28) and a pin B connected to a BLUETOOTH antenna (A3), and
j) a function indicating circuit (50) comprising: a set of LEDS (D1-D6) wherein LED D1 is a START/RECORD LED connected to pin F and said PRC (28), LED D2 is a STOP LED connected to pin G on said PRC (28), LED D3 is a PAUSE LED connected to pin H on said PRC (28), LED D4 is a MARK LED connected to pin I on said PRC (28), LED D5 is a PLAYBACK LED connected to pin J on said PRC (28), and LED D6 is a PAUSE-ON LED connected to pin K on said PRC (28), and
k) an audio input circuit (52) comprising a microphone (54) having an output pin (A) connected to pin (B) on an automatic volume control (AVC) audio amplifier (56) having an output pin (C) connected to pin D on said PRC (28).

7. The system as specified in claim 6 further comprising a plurality of function indicating LEDs (50) wherein an LED (D1) is a play back LED connected to pin (H) on said PRC (28), an LED (D2) is a transmitting/recording LED connected to pin G on said PRC (28), and an LED (D3) is a power LED connected to pin (F) on said PRC (28).

8. The system as specified in claim 6 further comprising USB controller (36) having a first side connecting to pin J on said PRC (28) and a second side connected to a USB jack (38).

9. The system as specified in claim 8 wherein said USB jack is designed to receive a plug-in memory stick (40).

10. The system as specified in claim 8 wherein said USB jack is designed to receive USB cable (42) that is attached to a computer.

11. A remotely controlled audio recording system (RARS 10) comprising:
A) a remote control unit (RCU 12) comprising:
  a) an RF integrated CPU (RIC 14) having pins (A-L)
  b) a power input circuit (PIC 16) comprising a power switch (S1) having a first side connected to pin A on said RIC (14) and a second side connected in series with the positive (+) terminal of a battery (B1) also having a negative (−) terminal connected to ground (G),
  c) a function select circuit (FSC 18) comprising:
    (1) a START/RECORD switch (S2) having a first side connected to pin B on said RIC and a second side connected to ground (G),
    (2) a STOP switch (S3) having a first side connected to pin C on said RIC (14) and a second side connected to ground (G),
    (3) a PAUSE switch (S4) having a first side connected to pin D on said RIC (14) and a second side connected to ground (G),
    (4) a MARK switch (S5) having a first side connected to pin E on said RIC (14) and a second side connected to ground (G),
    (5) a PLAYBACK switch (S6) having a first side connected to pin F on said RIC (14) and a second side connected to ground (G), and
  e) an RF transmitting antenna (A1) connected to pin L on said RIC (14),
B) an audio recorder (AR 26) comprising:
  a) a primary recording CPU (PRC 28) having pins A-J,
  b) a RF integrated CPU (RIC 30) having pins A-D, wherein pin A is connected to pin A on said PRC (28),
  c) a power input circuit (PIC 32) comprising a power switch (S7) having a first side connected to pin C on said RIC (30) and a second side connected in series with the positive (+) terminal of a battery (B2) also having a negative (−) terminal connected to ground (G),
  d) an EEPROM having a pin A connected to pin B on said RIC,
  e) an RF receiving antenna (A2) connected to pin D on said RIC,
  f) a USB controller (36) having a first side connected to pin J on said PRC (28) and a second side connected to a USB jack (38) designed to receive a plug-in USB memory stick (40) or a USB cable (42), that attached to a computer,
  g) an EEPROM program (44) connected to pin I on said PRC,
  h) an audio and voice storage circuit (46) that interfaces with said EEPROM (44),
  i) a playback switch (S8) connected to pin C on said PRC (28),
  j) a BLUETOOTH circuit (48) having a pin A connected to pin B on said PRC (28) and a pin B connected to a BLUETOOTH receiving antenna (A3), k) a plurality of function indicating LEDs (50) wherein an LED (D1) is a play back LED connected to pin (H) on said PRC (28), LED (D2) is a transmitting/recording LED connected to pin (G) on said PRC (28), and LED (D3) is a power LED connected to pin (F) on said PRC (28), and l) an audio input circuit (52) comprising a microphone (54) having an output pin (A) connected to pin (B) on an automatic volume control (AVC) audio amplifier (56) having an output pin (C) connected to pin (D) on said PRC (28).

12. The system as specified in claim 11 wherein said microphone is comprised of unidirectional microphone.

\* \* \* \* \*